No. 820,969. PATENTED MAY 22, 1906.
H. GRELCK.
SAW.
APPLICATION FILED OCT. 26, 1905.

Witnesses:
Arthur Greipe.
William Schulz.

Inventor:
Heinrich Grelck
by Hauer v Briesen Atty.

UNITED STATES PATENT OFFICE.

HEINRICH GRELCK, OF BARMSTEDT, GERMANY.

SAW.

No. 820,969.    Specification of Letters Patent.    Patented May 22, 1906.

Application filed October 26, 1905. Serial No. 284,457.

*To all whom it may concern:*

Be it known that I, HEINRICH GRELCK, a citizen of the German Empire, and a resident of Barmstedt, Province of Holstein, Germany, have invented certain new and useful Improvements in Saws, of which the following is a specification.

The heating of saws is a well-known drawback which is due to the fact that sawdust settles at the surfaces of cutting of the wood. In order to remedy the above drawback, the front of the saw-tooth is provided with one or more projections, which act as sawdust-removers and remove the sawdust as it is produced, thus preventing the saw from becoming heated. Owing to this arrangement, it is also possible to make the set of the teeth very small, as the removers always keep the cut clean, so that only the very end of the point of the tooth need be set. Owing to this construction, the thickness of the cut and the loss of material caused thereby are smaller when ordinary saws are used. It is therefore obvious that the cutting capacity of such a saw is greater, the cut straighter and cleaner, and the manipulation easier and more convenient than with saws of the ordinary kind.

A construction according to this invention is illustrated, by way of example, in the accompanying drawings, in which—

Figure 1:
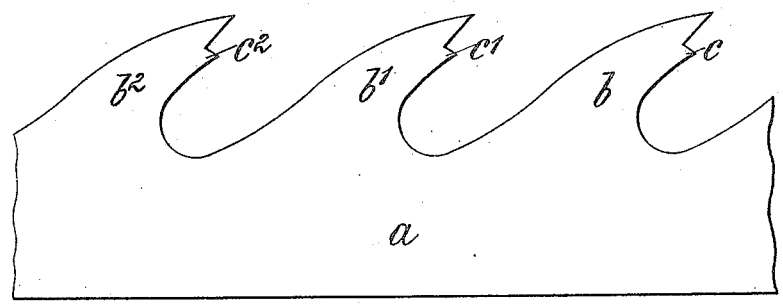
Figures 2, 4:
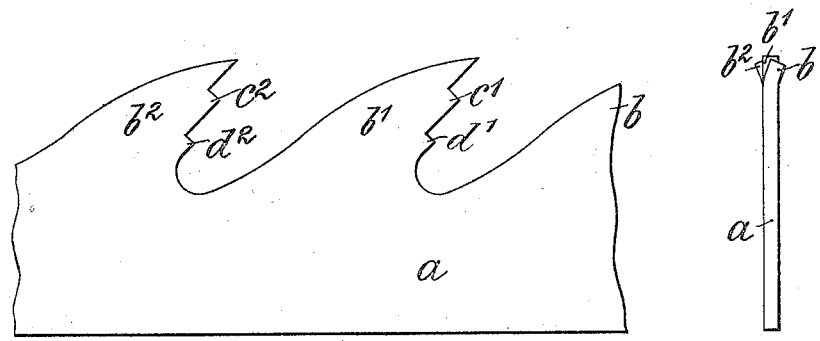
Figure 3:
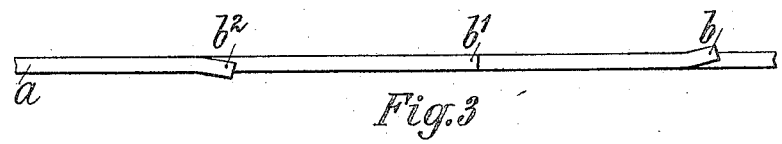

Figure 1 is a side elevation of a saw with a sawdust-remover on each tooth. Fig. 2 is a front elevation, and Fig. 3 a plan, of the same. Fig. 4 is a side elevation of a saw with two sawdust-removers on the front of each tooth.

$a$ is the saw-blade, and $b$ $b'$ $b^2$ the cutting-teeth, of which tooth $b$ is set to one side, tooth $b^2$ is set to the other side, while the intermediate tooth $b'$ is vertical. Each of the teeth is provided on its front or cutting edge and below its point with a projection $c$, $c'$, and $c^2$. In Fig. 4 each tooth is provided with two of said projections $c'$ $d'$ and $c^2$ $d^2$, as shown.

What I claim is—

A saw the cutting-teeth of which are provided on the front of the teeth with projections which prevent the sawdust from getting to the bottom of the intervals between the teeth and thence between the saw-blade and the cutting-surfaces.

Signed by me at Hamburg, Germany, this 12th day of October, 1905.

HEINRICH GRELCK.

Witnesses:
 FRIEDRICH J. POTHS,
 GEORGE T. C. BEHN.